UNITED STATES PATENT OFFICE.

EDWIN D. DOUGLASS, OF OGONTZ, PENNSYLVANIA.

FUEL AND METHOD OF TREATING SAME.

SPECIFICATION forming part of Letters Patent No. 673,654, dated May 7, 1901.

Application filed January 22, 1901. Serial No. 44,314. (No specimens.)

*To all whom it may concern:*

Be it known that I, EDWIN D. DOUGLASS, a citizen of the United States, and a resident of Ogontz, Pennsylvania, have invented certain Improvements in Fuel and in the Method of Treating the Same, of which the following is a specification.

My invention relates to the treatment of fuel, either in the form of wood broken or cut into suitable shape and size for burning or coal and coke, for the purpose of causing such fuel to produce when burning various colors of the solar spectrum.

My improved method of treating such fuel consists in impregnating the same with a liquid solution having in suspension certain chemicals which produce flames of specific colors when burned.

The principal object of my invention is to prepare fuel of the character set forth in such manner that the colors produced when the fuel is burned will be similar in all respects to the colors produced by burning sea driftwood. For this purpose I use the following mixture: crude rock-salt, two to eight ounces; powdered acetate of copper, three to nine ounces; water, one to five quarts. The salt and powdered acetate of copper are dissolved in the water, and the latter is preferably hot. A solution of the mixture having about two quarts of water with the other ingredients in the proper proportion is sufficient to treat about forty to sixty pounds of wood split into proper size and shape and about the same bulk of coal or coke. The fuel under treatment is permitted to remain in the solution from ten to fifteen days, after which it is dried in a kiln, or it may be dried in the open air exposed to the sun. This latter treatment will require about forty-eight hours.

The fuel to be treated should be preferably dry before being placed in the solution, and when such fuel is wood it is preferably warm. When in this condition, the wood is easily penetrated by the solution and the chemical ingredients of the same are carried to all portions of such fuel. When coke is treated, its porous nature will insure a complete saturation of the liquid solution; but the coal will only receive a coating of the mixture.

As some woods are harder and denser than others, treatment for a greater length of time may be necessary. The character of the flame may be changed by increasing the amount of salt used and decreasing the amount of acetate of copper, or vice versa, or by the addition to the solution of small quantities of the salts of barium, lithium, strontium, or potassium. I prefer, however, to use the solution of salt, acetate of copper, and water in about the proportions named.

The intensity of the colors produced by burning fuel treated in the manner herein set forth may be increased by sprinkling a small quantity of powdered rock-salt and acetate of copper upon such fuel when the same is burning.

Having thus described my invention, I claim and desire to secure by Letters Patent—

1. As a new article of manufacture, fuel impregnated with rock-salt and acetate of copper in solution.

2. As a new article of manufacture, fuel impregnated with rock-salt, acetate of copper and one or more salts of the alkaline earths in solution.

3. As a new article of manufacture, wood treated or impregnated with a solution of water, rock-salt and acetate of copper.

4. As a new article of manufacture, wood treated or impregnated with a solution of water, rock-salt, acetate of copper and one or more salts of the alkaline earths.

5. The herein-described process of treating fuel for the purpose of producing flames of different color when such fuel is burned, said process consisting in thoroughly drying such fuel in the presence of heat, and while warm exposing it to the action of rock-salt and acetate of copper dissolved in water.

6. The herein-described process of treating fuel for the purpose of producing flames of different color when said fuel is burned, said process consisting in thoroughly drying said fuel in the presence of heat, and while warm, exposing it to the action of rock-salt, acetate of copper and one or more salts of the alkaline earths dissolved in water.

7. The herein-described process of treating wood for the purpose of producing flames of different color when such wood is burned, said process consisting in thoroughly drying such wood in the presence of heat, and while warm, exposing it to the action of rock-salt and acetate of copper dissolved in water.

8. The herein-described process of treating wood for the purpose of producing flames of different color when such wood is burned, said process consisting in thoroughly drying said wood in the presence of heat and while warm, exposing it to the action of rock-salt, acetate of copper and one or more salts of the alkaline earths dissolved in water.

In testimony whereof I have signed my name to this specification in the presence of two subscribing witnesses.

EDWIN D. DOUGLASS.

Witnesses:
MURRAY C. BOYER,
JOS. H. KLEIN.